Nov. 3, 1931.   T. L. FAWICK   1,830,430

THREE-SPEED TRANSMISSION

Filed June 23, 1927    5 Sheets-Sheet 1

Witness:
William P. Kilroy

Inventor:
Thomas L. Fawick

Nov. 3, 1931.  T. L. FAWICK  1,830,430
THREE-SPEED TRANSMISSION
Filed June 23, 1927   5 Sheets-Sheet 2

Nov. 3, 1931. T. L. FAWICK 1,830,430
THREE-SPEED TRANSMISSION
Filed June 23, 1927 5 Sheets-Sheet 3

Nov. 3, 1931.   T. L. FAWICK   1,830,430
THREE-SPEED TRANSMISSION
Filed June 23, 1927   5 Sheets-Sheet 4

Witness:
William P. Kilroy

Inventor:
Thomas L. Fawick
Brown, Bortimer & Dienner
Attys.

Nov. 3, 1931.   T. L. FAWICK   1,830,430
THREE-SPEED TRANSMISSION
Filed June 23, 1927   5 Sheets-Sheet 5

Witness:
William P. Kilroy

Inventor:
Thomas L. Fawick
Brown, Boettcher & Dienner
Attys.

Patented Nov. 3, 1931

1,830,430

UNITED STATES PATENT OFFICE

THOMAS L. FAWICK, OF RACINE, WISCONSIN

THREE SPEED TRANSMISSION

Application filed June 23, 1927. Serial No. 200,822.

My invention relates to transmissions for automobiles and the like. The present transmission is an improvement upon the device disclosed and claimed in my prior application, Serial No. 197,777, filed June 10, 1927.

It is well recognized at present that a single driving ratio between engine and rear axle is not sufficient to meet present day demands. I have shown that by the use of an internal gear drive it is possible to provide a quiet gear ratio in or in series with the transmission. It has heretofore been the general practice in gear shift transmissions to provide three speed changes for accelerating the car from standstill and in my prior application, above referred to, I have provided two spur gear reductions, an internal gear reduction and a direct connection for providing four changes including two driving ranges.

According to the present invention I employ only three driving ratios including two driving ranges, thus further combining the functions of acceleration with changeable driving ratios. I provide in the preferred form a low speed first gear driving through spur gears, a relatively high speed second gear which is an internal drive solely, and a third which is direct. The second and third thereby present quiet drives, which in connection with a suitable rear axle ratio provide suitable ranges for the different driving conditions which prevail in congested traffic driving and in high speed open road travel.

The present transmission provides a single shift lever of the universal motion or stick type having the known H path for selecting the aforesaid three forward driving ratios and a reverse. Preferably, but not necessarily, the stick or lever stands normally in line with one of the legs of the H but this is optional:

The present transmission is light and compact, yet amply strong for its purpose. In order to conform to standard gear shift practice and to provide the advantages of a compact efficient unit I dispose the reverse gear shift position opposite low speed position and in line with the same. To prevent continuous running of the reverse gear I normally disconnect the same from the lay shaft and from the other gears and shift the same into mesh with a gear on the lay shaft and the internal sleeve only when reverse gear is required. However, a change in direction is required and to secure this I interpose a mechanism to move the reverse gears in the same direction as the shifter lever knob instead of the opposite direction. Obviously it is within my invention to dispose the reverse idler or idlers in constant mesh with either the lay shaft or the gear on the internal sleeve if the continuous running of the same is not objectionable. This naturally simplifies the control at the expense of constant running of the idler. Further objects and advantages of my invention will appear from the detailed description.

In the drawings:—

Figure 1:
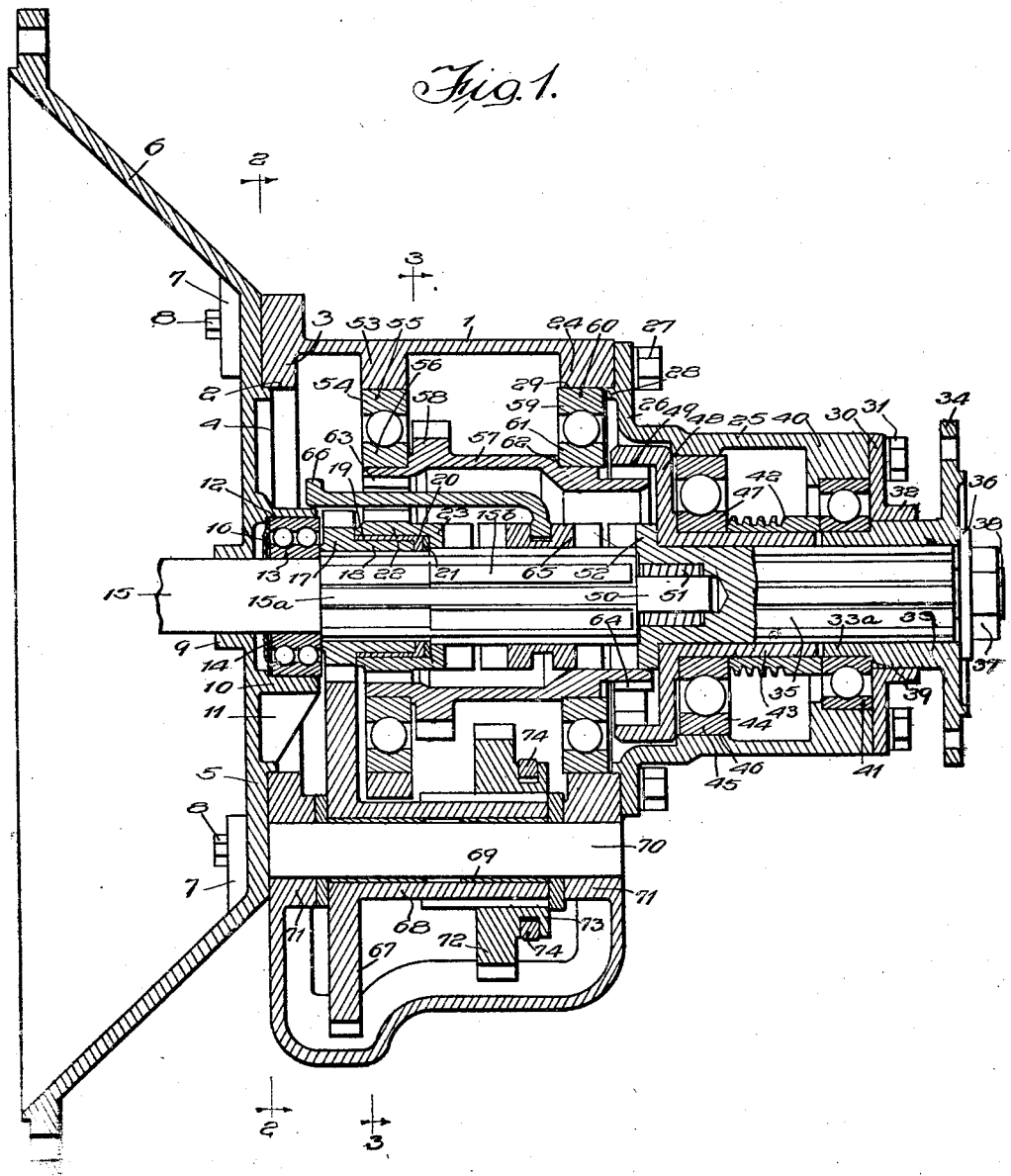
Fig. 1 is a horizontal section through the transmission taken substantially on line 1—1 of Fig. 2.
Figure 2:
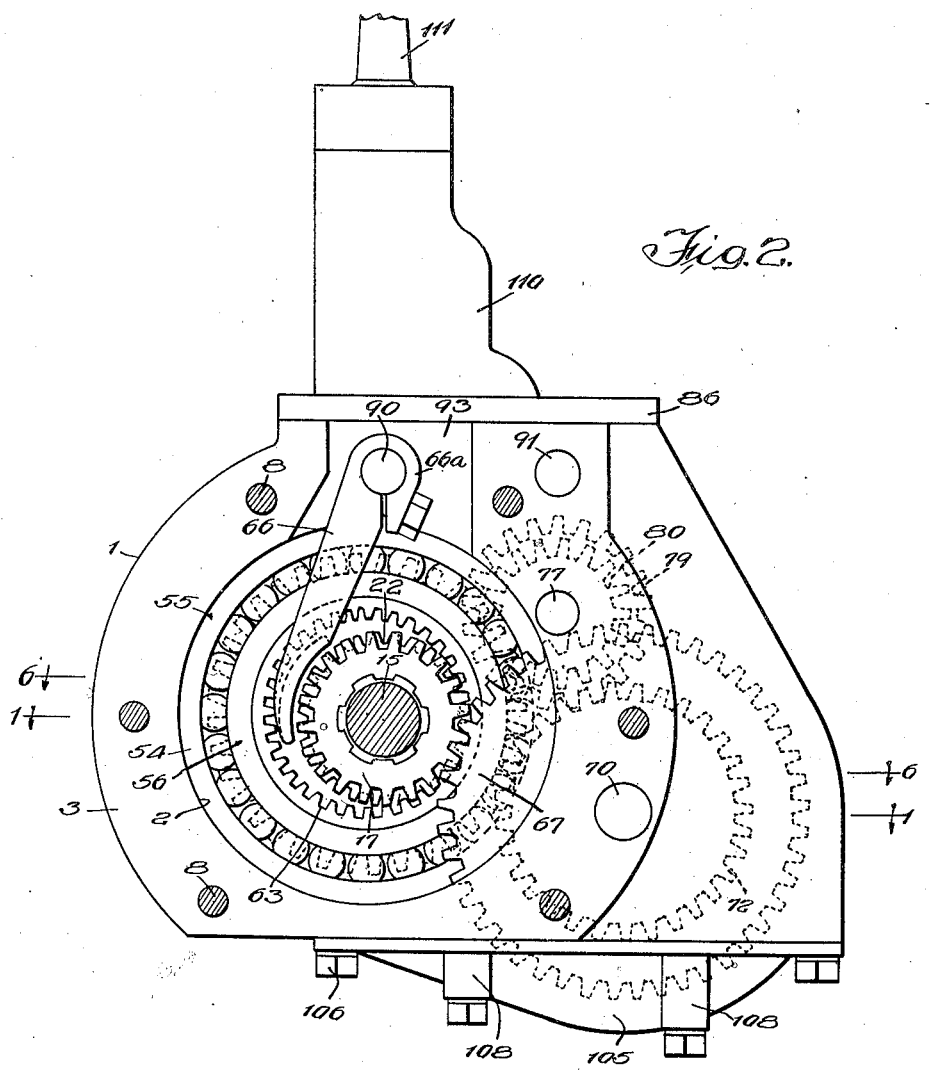
Fig. 2 is a front end view of the transmission taken substantially on line 2—2 of Fig. 1.

My transmission includes a suitable casing 1 provided in its forward end with a circular opening 2 about which extends a thick flange 3. This opening receives an annular flange 4 on the rearward face of an end plate 5 of a bell shaped section 6 of the clutch housing. Plate 5 is provided with suitably spaced bosses 7 through which pass cap screws 8, these cap screws threading into the flange 3 and serving to secure the casing 1 to section 6 of the clutch housing. Plate 5 is also provided with a central collar 9 projecting forwardly from the front face thereof, this collar being disposed concentric with a larger collar 10 extending from the rearward face of the plate and suitably braced by a web element 11. Collar 10 is provided with an annular recess in its inner face in which seats an outer ring 12 of a ball bearing structure 13 of suitable type, the inner ring 14 of this bearing fitting about drive shaft 15 which extends through the collar 9. The rearward portion 15A of this shaft is slightly enlarged forming a shoulder which abuts the rearward face of ring 14. Preferably, though not necessarily, a sheet metal ring 16 is disposed about shaft 15 and confined between the ball bearing structure 13 and the shoulder at the forward end of the recess which receives ring 12. This ring is of assistance in retaining lubricant about the bearing structure and prevents creeping of lubricant, to an undesirable extent, along the shaft 15. The bearing structure 13 provides an anti-friction bearing for the shaft and also co-operates with the shoulder of the enlarged portion 15A to take up axial thrust of this shaft forwardly thereof.

A pinion 17 is splined on portion 15A of shaft 15, the forward end of this pinion abutting the rearward end of the bearing ring 14. This pinion is provided with a rearwardly extending neck 18 about which is disposed a bearing sleeve 19 of brass or other suitable material provided at its rearward end with an inner annular flange 20 which fits about portion 15A of the shaft. A thrust collar 21 fits about the shaft and is confined between flange 20 and a shoulder at the forward end of the rearward end portion 15B of shaft 15, this portion being enlarged relative to portion 15A. The pinion 17 is thus secured against endwise movement on the shaft 16. A second pinion 22 is rotatably mounted on bearing sleeve 19 and is provided at its rearward end with a tooth clutch element 23 which extends over the rearward face of thrust collar 21. The pinion 22 is thus loosely mounted upon the drive shaft 15.

Casing 1 is provided with an opening through its rearward end disposed in alignment with opening 2, a second reinforcing flange 24 extending inwardly from the casing radially thereof and defining this opening. A cylindrical bearing-casing 25, provided with a base flange 26, is secured to the rearward end of casing by cap screws 27, or in any other suitable manner, this base flange being provided on its forward face with an annular rib 28 which fits snugly into the opening 29 of the casing. The rearward end of the bearing casing 25 is closed by a plate 30 secured thereto by cap screws 31, this plate being provided with a collar 32 which surrounds neck 33 of the coupling member 34 which is splined on driven shaft 35 and is held against rearward movement on the shaft by a securing ring 36 confined between the rearward end of the coupling member and a nut 37 threaded on a screw stud 38 at the rearward end of the driven shaft 35.

The forward portion 33A of neck 33 is reduced in thickness to form a shoulder 39. The bearing-casing 25 is provided, at its rearward end, with a relatively thick inwardly projecting flange 40 which serves to very materially reinforce the casing. This flange is provided, in its inner circumferential face, with an annular recess which takes the outer ring of a ball bearing structure 41 mounted about the reduced portion 33A of neck 33. The inner ring of this bearing structure is confined between shoulder 39 and the outer end of a worm gear 42 secured upon a sleeve 43 which is splined upon shaft 35. A second ball bearing structure 44 is mounted in the casing 25 adjacent the forward end thereof, the outer ring 45 of this structure being secured in a shoulder 46 of casing 25 and the inner ring 47 being mounted about sleeve 43 and confined between the forward end of worm gear 42 and a flange 48 at the forward end of the sleeve, this flange carrying an internal gear 49. The bearing structure in the bearing casing 25 thus serves to take the radial thrust of the driven shaft 35 and also serves to hold the sleeve 43 against endwise movement in either direction. The worm gear meshes with a worm (not shown) of an odometer of suitable type.

The driven shaft 35 is disposed in alignment with the drive shaft 15 and is bored out at its forward end for reception of a stud 50 formed at the rearward end of the drive shaft, roller bearings 51 being disposed between this stud and the surrounding wall of the recess of the driven shaft. Shaft 35 is provided at its forward end with a tooth clutch element 52 integral therewith or otherwise suitably secured to the driven shaft so as to be rigidly connected thereto. It will be noted that the rear face of clutch element 52 contacts with the flange 48 so as to prevent rearward movement of shaft 35. It will also be noted that forward movement of shaft 35 is effectively prevented by coupling member 34, ring 36, and the rearward bearing 41. The bearings in the casing 25 serve, therefore, to take up both radial and axial thrust of the driven shaft 35.

Casing 1 is provided adjacent its forward end, with a transversely extending web element 53 which is of relatively great thickness and serves to materially reinforce the casing. This web element is provided with a central opening in which is secured an outer ring 54 of a ball bearing structure 55 the inner ring 56 of which is secured about the forward end of the gear sleeve 57 and abuts the forward face of an external gear 58 adjacent the forward end of the sleeve. An outer ring 59 of a ball bearing structure 60 is secured in flange 24 at the rearward end of casing 1. The inner ring 61 of this bearshift rod 90 and the bore of this boss is in register with an opening 101 through the rear wall of casing 1 which accommodates the shift rod, boss 98 thus co-acting with element 89 of web element 53 to slidably support the shift rod 90. In the same manner boss 99 co-acts with sleeve 92 for slidably supporting the shift rod 91.

Figure 6:
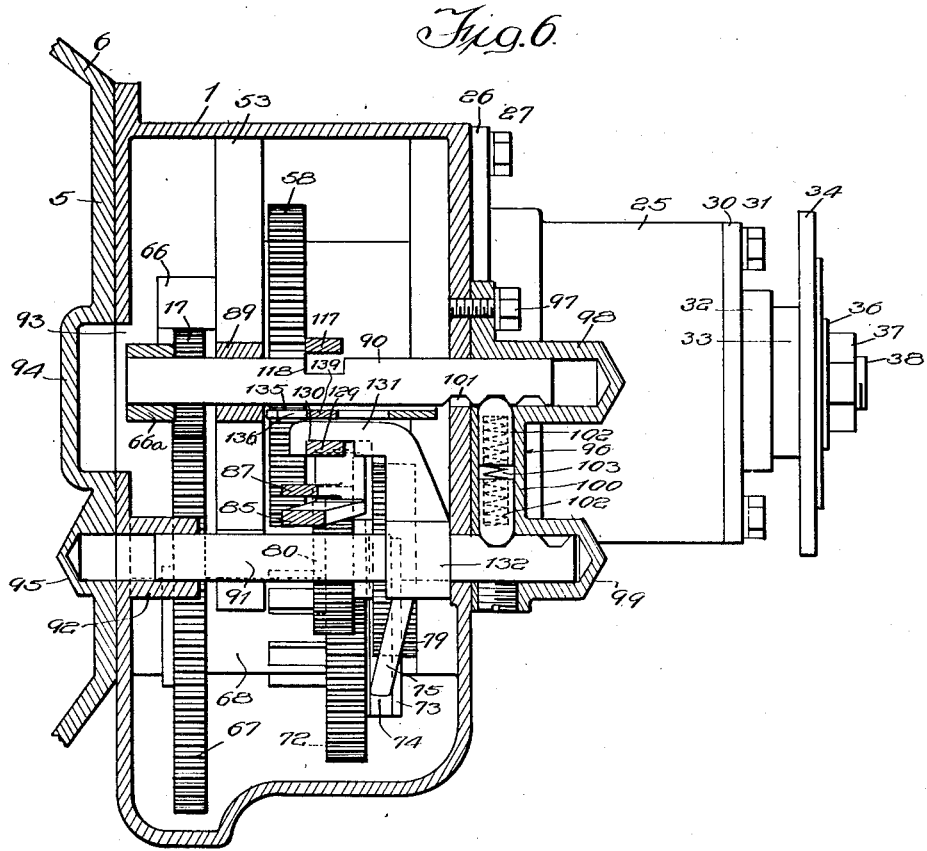
Fig. 6 is a section taken substantially on line 6—6 of Fig. 2.

Body 100 of the bracket plate is bored out from one end thereof through boss 99 to provide a housing which slidably receives a pair of oppositely directly locking bolts or tumblers 102 which are bored out from their inner ends for reception of an expansion coil spring seated therein. These bolts cooperate with notches in the shift rods 90 and 91 for releasably holding these rods in adjustment, in a known manner. As will be noted more clearly from Fig. 6, the recesses or notches in the shift rods are of substantially V-shape and the head or outer end of the bolt 102 is of rounded or tapered shape so that these bolts co-act with the inclined walls of the notches or recesses of these rods to complete the movement of the rod into a selected position. It will be understood, of course, that spring 103 is of proper strength to give this result without in any way preventing or interfering with proper operation of the shift rods. This function of the locking bolts is of particular value in connection with the operation of the shift rod 91 when this rod is returned to neutral or inoperative position, it being noted that this shift rod has but two positions, operative and in-operative.

The casing 1 is provided with an opening 104 through its bottom wall which is closed by a suitably shaped closure plate 105 secured to the casing by cap screws 106 passing thru the plate and threaded into flange 107 of the casing surrounding opening 104. The plate 105 is of dish or concavo-convex cross-section (Fig. 3,) and is accordingly provided at each end with suitable bosses 108 thru which certain of the securing cap screws 106 are inserted. The casing is also provided, at its upper end or top with an opening 109 which is closed by the cover plate 86 previously referred to, this plate being secured to the casing by cap screws (not shown) or in any other suitable manner. Plate 86 is provided with a central hollow pedestal or housing 110 projecting upwardly therefrom and suitably shaped to house the lower portion of a shift lever 111 and associated parts. The shift lever is provided with a ball 112 which is mounted for rocking movement forwardly and rearwardly upon a pin 113 secured diametrically of a neck 114 at the upper end of the pedestal 110. A flanged retaining ring 115 is threaded on the neck and serves to hold the pin 113 against displacement while providing a closure about the upper portion of the ball. The opening 116 through the ball, which accommodates pin 113, is so shaped as to permit rocking movement laterally of the lever on the pin in a counter clockwise or left-hand direction, as considered in Fig. 3, while preventing lateral movement of the shift lever from vertical position in the other or right-hand direction. The mounting of this shift lever is the same as that disclosed in my co-pending application filed June 10, 1927, Serial No. 197,777.

Shift lever 111 is provided at its lower end and at one side thereof, with an offset finger 117 which, when the lever is in neutral position, is disposed in alignment with a slot or notch 118 in the outer lateral portion of shift rod 90. By swinging the shift lever to the left as considered in Fig. 3, and Fig. 5, finger 117 engages into notch 118 thus operatively connecting the shift rod 90 to the shift lever so that by shifting lever 111 either forwardly or rearwardly in a straight line the clutch member 65 can be shifted into second or third speed position in the manner previously described.

Figure 5:
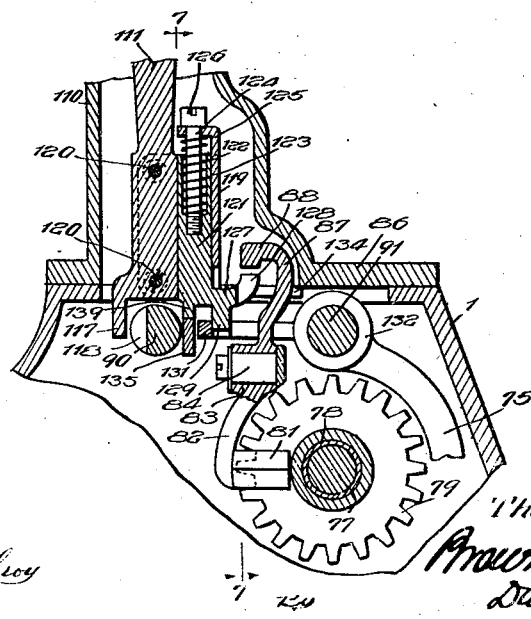
Fig. 5 is a section taken substantially on line 5—5 of Fig. 4.

A keeper 119 of substantially U-shape in cross-section is secured to the lower portion of shift lever 111 and projects to the opposite side thereof from finger 117. This keeper is secured to the lever by screws 120 or in any other suitable or preferred manner. A plunger 121 (Fig. 5,) is confined between the keeper and the lateral edge of lever 111 for vertical movement. This plunger is urged downwardly by an expansion coil spring 122 which seats in a recess 123 bored out from the upper end of the plunger. This spring is disposed about the shank of a screw 124 which passes through the horizontal arm of an L-shaped element 125 at the upper end of the bight portion of the keeper, this screw threading into the plunger 121 and the head 126 of the screw co-acting with element 125 to limit downward movement of the plunger. The spring is confined between the horizontal arm of element 125 and the lower end wall of the recess or bore 123 and serves to normally hold the plunger 121 in its lower position. At its lower end the plunger 121 is provided with a laterally projecting fork 127 the arms 128 and 128A of which are disposed to receive between them the inner end portion of element 88 at the upper end of arm 87 when the plunger is in full raised position. Normally the fork arm 128 is disposed below element 88, as illustrated in Fig. 5, so that forward movement of the plunger does not affect the reverse control lever.

Plunger 121 is further provided with a stud 129 depending from fork 127. This stud is disposed to enter a recess 130 formed in the forward end of an L-shaped arm 131 which is formed integrally with eye 132 at the upper end of shift arm 75, by means of which this arm is secured to the shift rod 91. As will be noted from Fig. 6, both the stud 129 and the recess therefor are of rectangular crossing structure fits about sleeve 57 adjacent the rearward end thereof, and the forward face of this ring abuts a shoulder 62 formed on the sleeve 57. The two ball bearing structures serve to rotatably support sleeve 57 in eccentric relation to the drive shaft 15 and also serve to hold this sleeve against endwise movement in either direction.

Sleeve 57 is provided, at its forward end, with an internal gear 63 which meshes with pinion 22. At its rearward end sleeve 57 is provided with an external gear 64 which meshes with internal gear 49 of sleeve 43. A double ended tooth clutch member 65 is splined on portion 15B of shaft 15 and is shifted into operative relation to clutch element 23 or 52, optionally, by means of a shift arm 66 which extends between the upper portion of sleeve 57 and the drive shaft 16, this arm being connected to a shift rod operated by a shift lever in a known manner. With the parts in the positions illustrated in Fig. 1, the shafts 15 and 35 are disconnected by shifting the clutch member 55 forwardly into operative relation to clutch element 23. The pinion 22 is thus clutched to the drive shaft 15 for rotation therewith. Shaft 35 is then driven from shaft 15 thru pinion 22 and gear 63, sleeve 57 and gears 64 and 49 and sleeve 43. This gives a gear ratio drive between the two shafts to produce the second speed forward. By shifting the clutch member 65 rearwardly into operative relation to clutch element 62 shaft 35 is clutched directly to shaft 15 giving a direct high speed driving connection between the two shafts to produce the third speed forward drive.

Pinion 17 meshes with a spur gear 67 formed integrally with a sleeve or tubular lay shaft 68 at the forward end thereof. Sleeve 68 is rotatably mounted, by means of suitable bushings 69, on a spindle 70 which is secured in suitable bosses 71 projecting inwardly from the end walls of the casing 1. A spur gear 72 is splined on the sleeve or lay shaft 68, this gear being provided with a grooved neck 73 which receives the arms 74 of the fork of a shift arm 75 by means of which the gear 72 is shifted into and out of mesh with external gear 58 of sleeve 57. When gear 72 is shifted into operative position the drive is from pinion 17 thru gear 67, sleeve or lay shaft 68, gears 72 and 58, sleeve 57, and gears 64 and 49 and sleeve 43 to drive shaft 35. This gives the low speed forward driving connection between the driven shaft 35 and the drive shaft 15.

Figure 4:
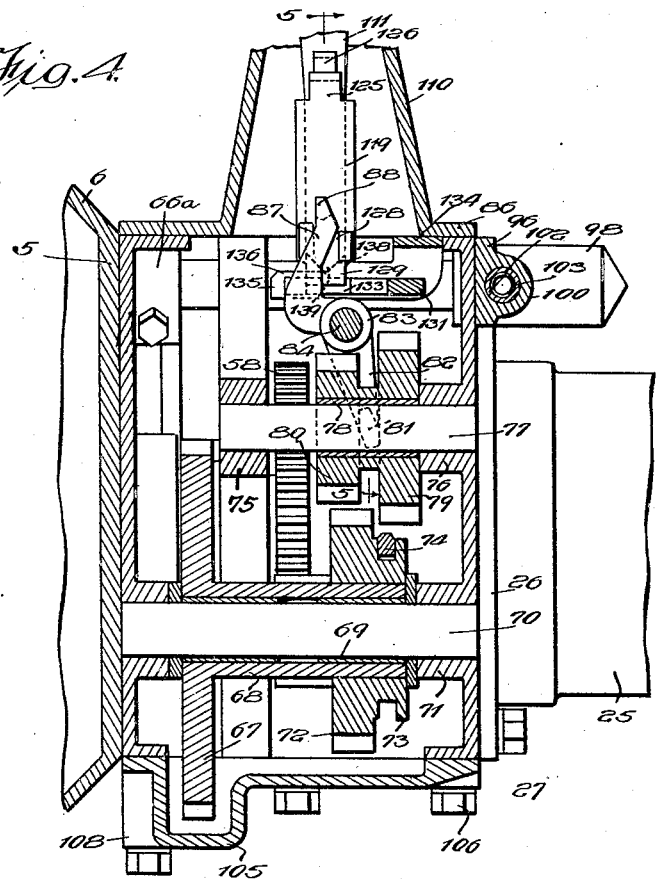
Fig. 4 is a section taken substantially on line 4—4 of Fig. 3.

By referring to Fig. 4, it will be noted that the web element 53 is provided with a lateral extension 75 which is disposed in alignment with a collar 76 projecting forwardly from the inner face of the rear end plate of casing 1. A spindle 77 is secured in the members 75 and 76 and slidably and rotatably supports a gear unit mounted thereon by means of a suitable bushing 78. This gear unit includes a spur gear 79 and a pinion 80 formed integrally with the gear or otherwise suitably secured thereto. The gear and the pinion are spaced apart to receive between them a suitably shaped finger 81 at the lower end of an arm 82 provided at its upper end with a short sleeve 83 which is mounted on a stud 84 at the lower end of a supporting bracket 85 secured to a cover plate 86 of the casing 1. A second arm 87 extends from sleeve 83 oppositely to arm 82, the two arms and the sleeve constituting a reverse control lever. At its upper end the arm 87 is provided with an element 88 of substantially L shape, this element being disposed at right angles to the arm and projecting inwardly therefrom. The reverse control lever is rockable about the stud 84 on an axis at right angles to the axis of spindle 77 so that, by shifting or rocking this arm the reverse gear unit can be shifted into and out of operative position along the spindle 77. When this unit is shifted into operative position gear 79 meshes with the gear 72 and the pinion 80 is brought into mesh with the external gear 58 of sleeve 57. This gives the reverse drive connection between shaft 15 and shaft 35, the drive being the same as for the low speed forward drive with the exception that the gear 72 is connected to the external gear 58 thru the medium of gear 79 and pinion 80 to give the reverse direction of drive.

The web element 53 is further provided, at its upper portion, with an extension 89 forming a bearing collar thru which is slidably mounted a shift rod 90 controlling the second and third speeds forward. Shift arm 66 of the clutch member 65 is secured to the forward end of rod 90 for movement therewith. A second shift rod 91 is mounted in the upper portion of casing 1 adjacent and parallel with rod 90, the forward portion of rod 91 being slidably mounted in a supporting sleeve 92 projecting rearwardly from the front end wall of casing 1. This end wall, as previously noted, abuts the end plate 5 of section 6 of the clutch housing and is provided with an opening 93 which accommodates sleeve 66A of arm 66 which is secured on rod 90. Plate 5 is provided, at its upper portion, with a hollow boss or offset 94 to accommodate the forward end of shift rod 90 and sleeve 66A when this rod is shifted into its extreme forward position. Plate 5 is further provided with a hollow boss 95, the bore of which registers with the bore of sleeve 92 and which accommodates the forward end of shift rod 91 when this rod is moved into its foremost position. A flanged bracket plate 96 is secured to the rearward end of casing 1 by cap screws 97 or in any other suitable manner. This plate includes rearwardly projecting bosses 98 and 99 which are connected by a substantially cylindrical body portion 100 of the plate. Boss 98 is disposed in alignment with section and the rearward wall of this recess is normally spaced away from the stud 29 providing a space 133, giving a lost motion connection between the arm and the stud. The stud 129 serves to normally connect arm 131 to the shift lever 111 for movement therewith, when the rod is in normal position so that by shifting lever 111 rearwardly the shift lever 91 is moved forwardly advancing the gear 72 into mesh with external gear 58 of sleeve 57 to give the low speed forward drive.

Figure 7:
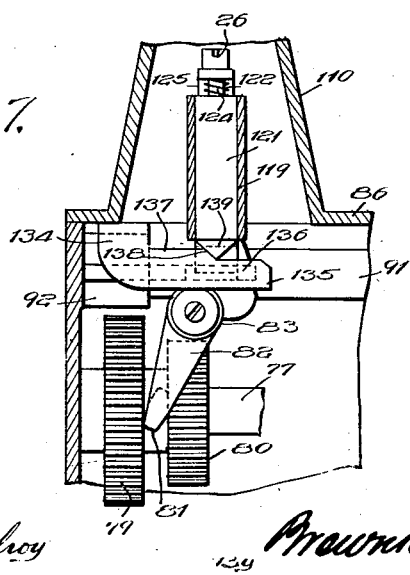
Fig. 7 is a section taken substantially on line 7—7 of Fig. 5.

A cam member 134 of substantially L-shape is secured to cover plate 86. This member is provided with a forwardly projecting arm 135 having a relatively narrow forward portion 136 and a relatively wide rearward portion 137 connected to the forward portion by an inclined portion constituting a cam surface 138. The plunger 121 is provided at its lower end with a V-shaped element or extension 139 the point of which travels upon the upper edge or face of arm 135. When the plunger is in its lowered position illustrated in Fig. 5 and Fig. 7, the point 139 contacts with the upper face of the narrow portion 136 of arm 135. This permits forward movement of the plunger along arm 135 to shift into low speed forward without affecting the reverse control lever. When it is desired to shift into reverse, shift lever 111 is brought forwardly moving the plunger 121 rearwardly beyond the position illustrated in Fig. 7. This causes point 139 to travel upon the cam surface 138 thus raising the plunger 121 sufficiently to disengage stud 129 from arm 131. This movement of the plunger serves to also raise fork 127 so that the arms 128 and 128A thereof engage about the inner end of element 88 of arm 87, and continued rearward movement of plunger 121 serves to rock the reverse control lever about stud 84 in proper direction to shift the reverse gear unit into operative position giving the reverse drive. It is to be noted that, when the low speed gear 72 is in full operative position, the upper end of arm 128A, which is larger than arm 128, is disposed closely adjacent element 88 and the fork is raised sufficiently for stud 129 to clear arm 131 by the time the stud reaches the back of space 133. The increased length of arm 128A ensures that this arm will contact with element 88 as soon as the shift lever has been moved but a very slight distance in reverse direction. The shift rod 91 is moved into substantially full neutral position by the positive connection between stud 129 and arm 131, the last part of this movement of this shift rod being completed by the locking bolt 102. Upon return of the shift lever 111 to neutral position, the reverse control lever will be operated to return the reverse gear unit to neutral position, after which plunger 121 will be depressed so as to disengage the fork arm 128 from element 188 and cause stud 129 to enter its recess 130. It will thus be seen that the shift lever, when in neutral position, can be used to shift into either low speed forward or reverse by a straight line movement and, when the lever is moved from either of these positions into the other position it is automatically connected and disconnected to and from the part actuated thereby so as to insure proper shift of the gear.

Figure 3:
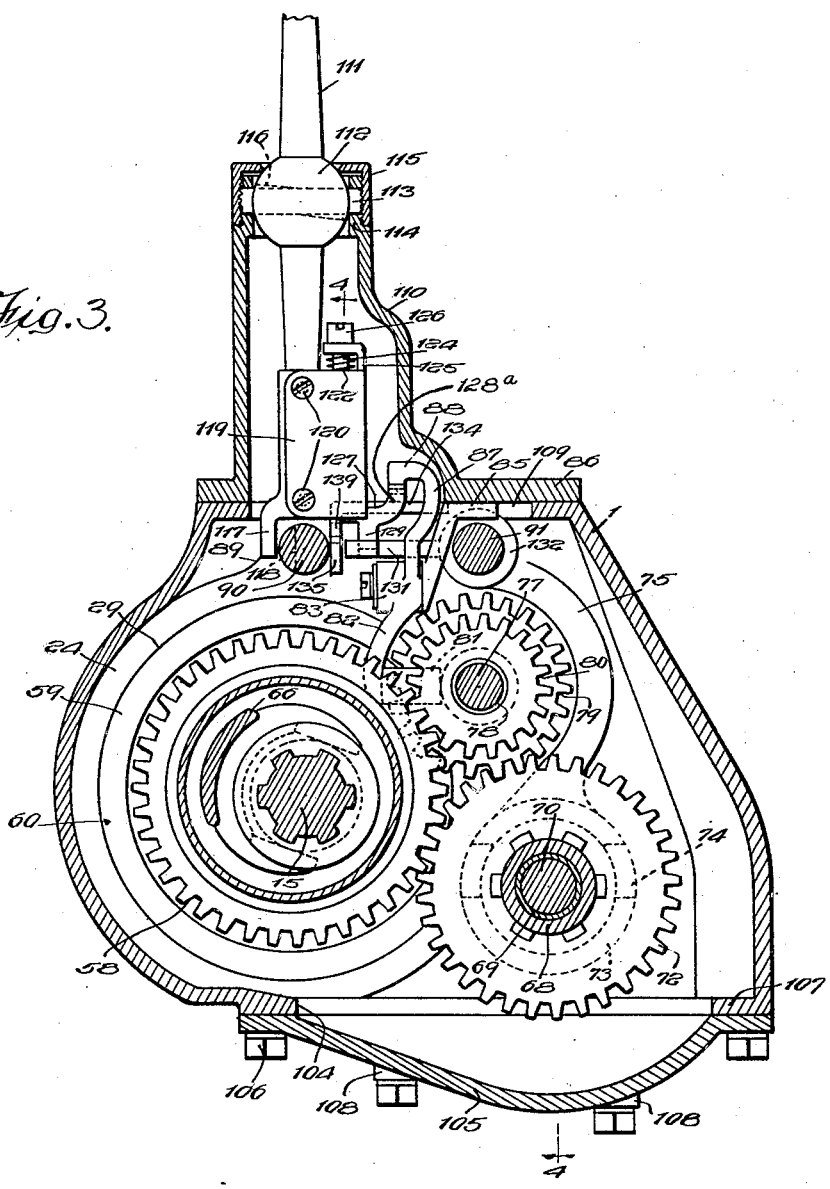
Fig. 3 is a section taken substantially on line 3—3 of Fig. 1.

When the shift lever 111 is moved to the left as considered in Fig. 3 and Fig. 5, so as to be connected to shift rod 90 in the manner previously described, the V-shaped element 139 of plunger 121 is moved laterally toward the right off of the cam 135 and the stud 129 is similarly moved out of its recess 130 beyond the arm 131. This disconnects the shift lever from both the shift rod 91 and the reverse control lever so that neither of these members is actuated when the shift lever is operated to shift into either second or high. It will thus be seen that the shift lever can be operated from neutral position with a straight line movement into either low or reverse, or from low to reverse or vice versa and, when the shift lever is swung to the left it can be operated with a straight line movement to shift into either second or third gear. Attention is called to the fact that Figs. 3 and 5, are taken looking toward the rear of the transmission so that, in practice, the shift lever 111 will be moved to the right when it is desired to shift into second or third speed so as to be positioned out of the way of the driver.

While I have illustrated a tooth type of clutch for clutching the pinion 22 to shaft 15, or for clutching the shafts 15 and 35 together, it will be understood that any other suitable type of clutch, such as the McCarrell clutch illustrated in my co-pending application for transmission, Serial No. 197,777, filed June 10, 1927 can be employed.

As previously stated the idler 80 might be left in constant mesh with gear 58 on the sleeve 57 and reverse secured by merely shifting gear 72 back into mesh with idler 79 to secure reverse. This simplifies the control mechanism but it does so at the expense of constant running of the idler gears. For certain purposes this is not objectionable. It is also possible to have gear 79 constantly driven by a fixed gear on the lay shaft 68 and to shift 80 into mesh with gear 58 but this increases the length of the transmission and does not substantially simplify the control.

I wish to call attention to the fact that instead of maintaining the pinion 22 in constant mesh with internal gear 63 and clutching to the same with clutch 65 I may make said pinion 22 integral with clutch 65 and shift the same out of mesh with the internal gear 63 when the parts are in neutral and when clutch 65 engages clutch 52. As above indicated and as will be understood, changes in construction and arrangement of parts of the invention can be resorted without departing from the field and scope of the same, and I intend to include all such variations as fall within the scope of the appended claims, in this application in which the preferred form only of my invention is disclosed.

What I claim is:—

1. In a transmission, a casing, a drive shaft, a driven shaft, a first sleeve disposed about the drive shaft eccentric thereto, bearing structures secured in the casing and rotatably supporting said first sleeve adjacent each end thereof, said bearings holding the sleeve against endwise movement, said drive and driven shafts having substantially abutting relation with one bearing in the other rearwardly of the rearwardmost bearing structure for said first sleeve, a second sleeve keyed on the driven shaft, bearing structures secured to the casing and rotatably supporting the second sleeve while holding it against endwise movement, a gear ratio drive between the two sleeves, a pinion loosely supported on the drive shaft, the first sleeve having an internal gear meshing with said pinion, and means for clutching the pinion to the drive shaft or for clutching the drive shaft to the driven shaft for direct drive, optionally.

2. In a transmission, a drive shaft, a driven shaft, a rotatably mounted sleeve disposed about the drive shaft eccentric thereto and provided with an internal gear, a pinion loosely supported on the drive shaft and meshing with said gear, a second sleeve keyed on the driven shaft, a gear ratio drive between the two sleeves, said pinion having a clutch element at its rearward end and the driven shaft having a clutch element at its forward end, a clutch member splined on the drive shaft and having dog clutches at its ends for endwise engagement with and disengagement from the clutch elements on the loose pinion and on the driven shaft, selectively, and means for shifting said clutch member, said shiftable clutch member being disposed at all times within the eccentric sleeve and between the internal gear thereof and the gear ratio between said sleeve and the other sleeve.

3. In a transmission, a drive shaft, a driven shaft, a rotatably mounted sleeve disposed about the drive shaft eccentric thereto and provided with an internal gear, a pinion loose on the drive shaft and meshing with said gear, a second sleeve keyed on the driven shaft, a gear ratio drive between the two sleeves, said pinion having a clutch element at its rearward end and the driven shaft having a clutch element at its forward end, a clutch member splined on the drive shaft and shiftable into operative relation to either one of said clutch elements, selectively, a second pinion keyed on the drive shaft, a rotatably mounted lay shaft, a gear secured on the lay shaft and meshing with said second pinion, the sleeve about the drive shaft having an external gear, a gear splined on the lay shaft and of a size to mesh with said external gear, and means for selectively shifting the clutch member and the gear splined on the lay shaft.

4. In a transmission, a drive shaft, a driven shaft, a rotatably mounted sleeve disposed about the drive shaft eccentric thereto and provided with an internal gear, a pinion loose on the drive shaft and meshing with said gear, a second sleeve keyed on the driven shaft, a gear ratio drive between the two sleeves, said pinion having a clutch element at its rearward end and the driven shaft having a clutch element at its forward end, a clutch member splined on the drive shaft and shiftable into operative relation to either one of said clutch elements, selectively, a second pinion keyed on the drive shaft, a rotatably mounted lay shaft, a gear secured on the lay shaft and meshing with said second pinion, the sleeve about the drive shaft having an external gear, a gear splined on the lay shaft of a size to mesh with said external gear, a pair of reverse gears secured together and rotatably and slidably mounted to be shifted into and out of mesh with said external gear and the gear splined on the lay shaft, respectively, when said splined gear is in neutral position, and means for selectively shifting the clutch member and said reverse gears and the splined gear.

5. In a transmission of the herein described type, a driving shaft having a low speed pinion, a driven shaft having an internal gear, said shafts being piloted in alinement, a lay shaft having a low speed gear, a sleeve embracing a portion of the driving shaft and having external teeth meshing with the internal gear, a pinion adapted to be selectively driven by the driving shaft for driving said sleeve, said sleeve having internal teeth for cooperating with said latter pinion, means to clutch the driving to the driven shaft, said sleeve having external gear teeth intermediate its ends, a shiftable gear on the lay shaft for meshing with said latter external teeth and reverse gearing having gear teeth adapted to mesh with both said low speed gear and said latter external teeth on said pinion but being out of mesh with both during all forward drives.

6. In a transmission of the character described, a drive shaft, a driven shaft, a sleeve keyed on the driven shaft and having an internal gear, a pinion keyed on the drive shaft, a second pinion loose on the drive shaft adjacent the first pinion and having clutch elements at its inner end, the driven shaft being provided at its forward end with clutch elements secured thereto, a clutch member splined on the drive shaft between said loose pinion and the driven shaft, said member having clutch elements at its ends for cooperation with the clutch elements of the loose pinion and the driven shaft, a sleeve mounted about the drive shaft eccentrically therewith and having an internal gear meshing with the loose pinion and an external gear meshing with the internal gear of the driven shaft sleeve, a shift arm extending into the drive shaft sleeve between the same and the loose pinion and operatively connected to said clutch member, a lay shaft, a spur gear secured on the lay shaft and meshing with the pinion keyed on the drive shaft, a second external gear carried by and secured to said drive shaft sleeve, and a spur pinion splined on the lay shaft and shiftable into and out of mesh with said second external gear.

7. In a transmission, a driving shaft, a driven shaft, a pinion loosely surrounding the driving shaft, a pinion fast on said driving shaft, an internal gear on the driven shaft, an eccentric sleeve having an external gear at one end meshing with the internal gear on the driven shaft and an internal gear at the opposite end meshing with the pinion loosely surrounding the driving shaft, a connecting sleeve splined upon the driving shaft and shiftable to connect said shafts directly or said first mentioned pinion to said driving shaft, an external gear on said eccentric sleeve and intermediate the ends thereof, a lay shaft having a gear fixed thereto and in mesh with said pinion fast on the driving shaft, a gear splined on said lay shaft and movable into and out of mesh with said intermediate gear.

In witness whereof, I hereunto subscribe my name this 15th day of June, 1927.

THOMAS L. FAWICK.